United States Patent [19]

Skingley

[11] 3,902,119

[45] Aug. 26, 1975

[54] DIVERSE SIGNAL COMBINING ARRANGEMENTS

[75] Inventor: Brian Stanley Skingley, Chelmsford, England

[73] Assignee: The Marconi Company Limited, Chelmsford, England

[22] Filed: Mar. 27, 1974

[21] Appl. No.: 455,076

[30] Foreign Application Priority Data

Mar. 27, 1973 United Kingdom .............. 14574/73

[52] U.S. Cl. ................. 325/305; 325/369; 325/431

[51] Int. Cl.$^{2}$ ........................................... H04B 7/08

[58] Field of Search ........... 325/302, 304, 305, 307, 325/366, 367, 368, 369, 371, 431, 434; 343/205, 206

[56] References Cited

UNITED STATES PATENTS

| | | | |
|---|---|---|---|
| 2,622,191 | 12/1952 | Van Zelst | 325/431 |
| 3,305,781 | 2/1967 | Robinson | 325/305 |

*Primary Examiner*—Benedict V. Safourek
*Attorney, Agent, or Firm*—Baldwin, Wight & Brown

[57] ABSTRACT

A diversity combining arrangement is provided with a signal handling arrangement for each channel with each arrangement including two balanced mixers fed with input signals in parallel a second input for one mixer being obtained through a side band filter from the other mixer and the output from the one mixer being passed through a further filter as an output signal for combining with other channels and as a second input for the other mixer and in which the contribution to the combined signal provided by each channel is controlled in dependence upon the degree of intermodulation present in that channel.

4 Claims, 3 Drawing Figures

DIVERSE SIGNAL COMBINING ARRANGEMENTS

This invention relates to diverse signal combining arrangements.

Figure 1:
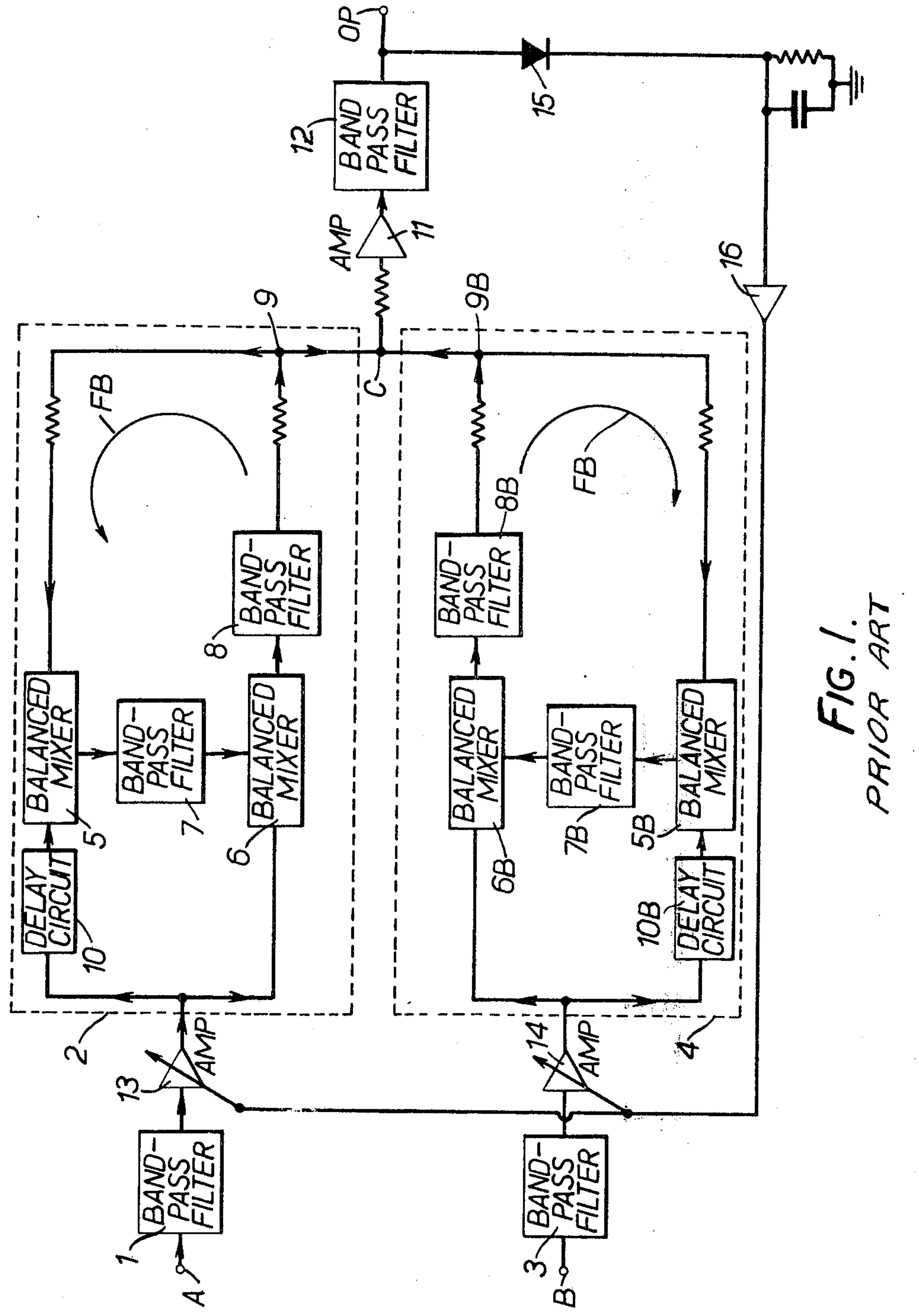
FIG. 1. PRIOR ART

A typical known diverse signal combining arrangement is illustrated in FIG. 1 of the accompanying drawings.

Referring to FIG. 1, two input terminals A and B are provided to receive signals in two diverse channels. The diverse channels applied to terminals A and B are required to be combined at a common output terminal OP. Terminal A is connected via a band pass filter 1, to a signal handling circuit within the dashed line block 2. Terminal B is similarly connected via a band pass filter 3 to a signal handling circuit shown within dashed line block 4. The purpose of each signal handling circuit 2 or 4 is to remove the instantaneous phase angle of the signals in the channel connected thereto and for this reason these circuits are sometimes called "phase isolating circuits".

The signal handling circits 2 and 4 are similar in detail and only signal handling circuit 2 will be specifically described, like parts in signal handling circuit 4 being identified by like references but with the suffix "B". Within the signal handling circuit 2, input signals are applied in parallel to two balanced mixers (otherwise known as four quadrant multipliers) 5 and 6. A second input for balanced mixer 6 is obtained from balanced mixer 5, via a narrow band pass filter 7, which is arranged to pass the lower side tone of the output of balanced mixer 5. The band pass of filter 7 is narrow compared with the expected band width of input signals applied to input terminal A. In practice the band width of filter 7 is commonly 0.01 percent of the band width of signals expected to be applied to terminal A. Output from balanced mixer 6 is applied via a band pass filter 8 to an output terminal 9. Band pass filter 8 is again arranged to pass the lower side tone of balanced mixer 6, but has a band width which is wider than that of filter 7, sufficiently wide in practice to pass the expected excursions of the input signals applied to input terminal A. The second input for balanced mixer 5 is derived from the output of band pass filter 8. Mixer 5, filter 7, mixer 6 and filter 8 form a positive feedback loop as indicated by the arrow FB. Delay circuit 10 at the input to mixer 5 is included to balance the delay inherently suffered by signals applied to the second input of mixer 5 due to the transit time effects of mixer 6 and band pass filter 8.

Output terminals 9 and 9B are connected together at common terminal C and the signals thus combined are passed via an amplifier 11 and a band pass filter 12 to the combined output terminal OP for detection.

It will be noted that between band pass filter 1 and signal handling circuit 2 in an amplifier 13 of variable gain (i.e an AGC amplifier), whilst between band pass filter 3 and signal handling circuit 4 is a further amplifier 14 of variable gain. Amplifiers 13 and 14 are connected jointly to be controlled by an AGC circuit consisting of a rectifier 15 and amplifier 16, connected to sample output signals at common output terminal OP. Amplifiers 13 and 14 and the AGC circuit 15 and 16 are provided to achieve a ratio squaring effect if the transfer characteristics of the signal handling circuits 2 and 4 are square law, as is well known.

To explain the operation of the diverse signal combining arrangement illustrated in FIG. 1, it is convenient to consider a practical example of input signals applied to input terminals A and B.

It is therefore assumed that the frequency of the channel applied to input terminal A is 70 MHz with modulation and instantaneous phase angle $\alpha$ and that the signal at the output terminal 9 is 59.3 MHz with modulation and instantaneous phase angle $\theta$. By virtue of the action of the mixer 5, therefore, the signal applied to band pass filter 7 is 10.7 MHz with instantaneous phase angle $\alpha - \theta$. Because of the effect of the delay circuit 10 in equalising the delay experienced by the two input signals to mixer 5, the modulation components cancel.

Thus the two signals applied to balanced mixer 6 are 70 MHz, with modulation and instantaneous phase angle $\alpha$ from input terminal A, and 10.7 MHz, without modulation and of instantaneous phase angle $\alpha - \theta$, from the output of balanced mixer 5 via filter 7. The lower side band output of mixer 6 applied to band pass filter 8 is, 59.3 MHz with modulation and instantaneous phase angle $\theta$. Thus the instantaneous phase angle of the incoming signal applied to terminal A has been removed and the previously assumed signal at the output of balanced mixer 6 of 59.3 MHz with modulation and instantaneous phase angle $\theta$, established.

Similarly, if the second channel applied to terminal B was of 70 MHz with modulation and of instantaneous phase angle $\beta$, then the output of balanced mixer 6B would be 59.3 MHz with modulation and instantaneous phase angle $\theta$.

It is often required, in an arrangement such as is described above, to combine the outputs from the two signal handling arrangements 2 and 4 such that the contribution of each, depends upon the degree of freedom of the signal applied to each from intermodulation products.

One object of the present invention is to provide an improved diverse signal combining arrangement in which this is achieved.

According to this invention a diversity combining arrangement comprises a plurality of signal handling arrangements, one of each diverse channel to be combined, each having means for connecting an individual diverse signal channel thereto and each comprising two balanced mixers, means for applying input signals in parallel to both mixers, means for deriving a second input for one of said multipliers from the output of the other via band pass filter means adapted to pass signals in one of the side bands of the output from said other mixer, further band pass filter means connected to apply output from said one mixer as second input for said other mixer, output means for taking output signals from the output of said first mentioned band pass filter means, means being provided for combining the output signals appearing at the output means of each signal handling circuit under the control of comparator means connected to derive inputs from intermodulation product signal detecting means provided one for each signal handling arrangement and each connected to the output of the said one multiplier in the respective signal handling circuit, whereby the contribution from each channel to the combined output signal is related to the degree of intermodulation present in that channel.

Preferably each of said intermodulation component signal detector means comprises a mixer connected in each case to derive one input from the output of said one mixer and a second input from the output of said further band pass filter means.

Preferably, in each case, the output of said mixer is connected to the input of a logarithmic amplifier, the output of which is connected via a detector circuit to said comparator means which is a D.C. signal comparator.

The present invention is applicable not only to arrangements such as that shown in FIG. 1 in which the band pass filters 7 and 7B are fixed filters, but also to arrangements in accordance with the invention in U.S. Pat. No. 3,859,601 in which said further band pass filters are such as to be capable of tracking in response to the frequency of input signals applied thereto so that the combining arrangements will cope with greater separation of the frequencies of the channels to be combined as is explained in that copending application.

Figure 2:
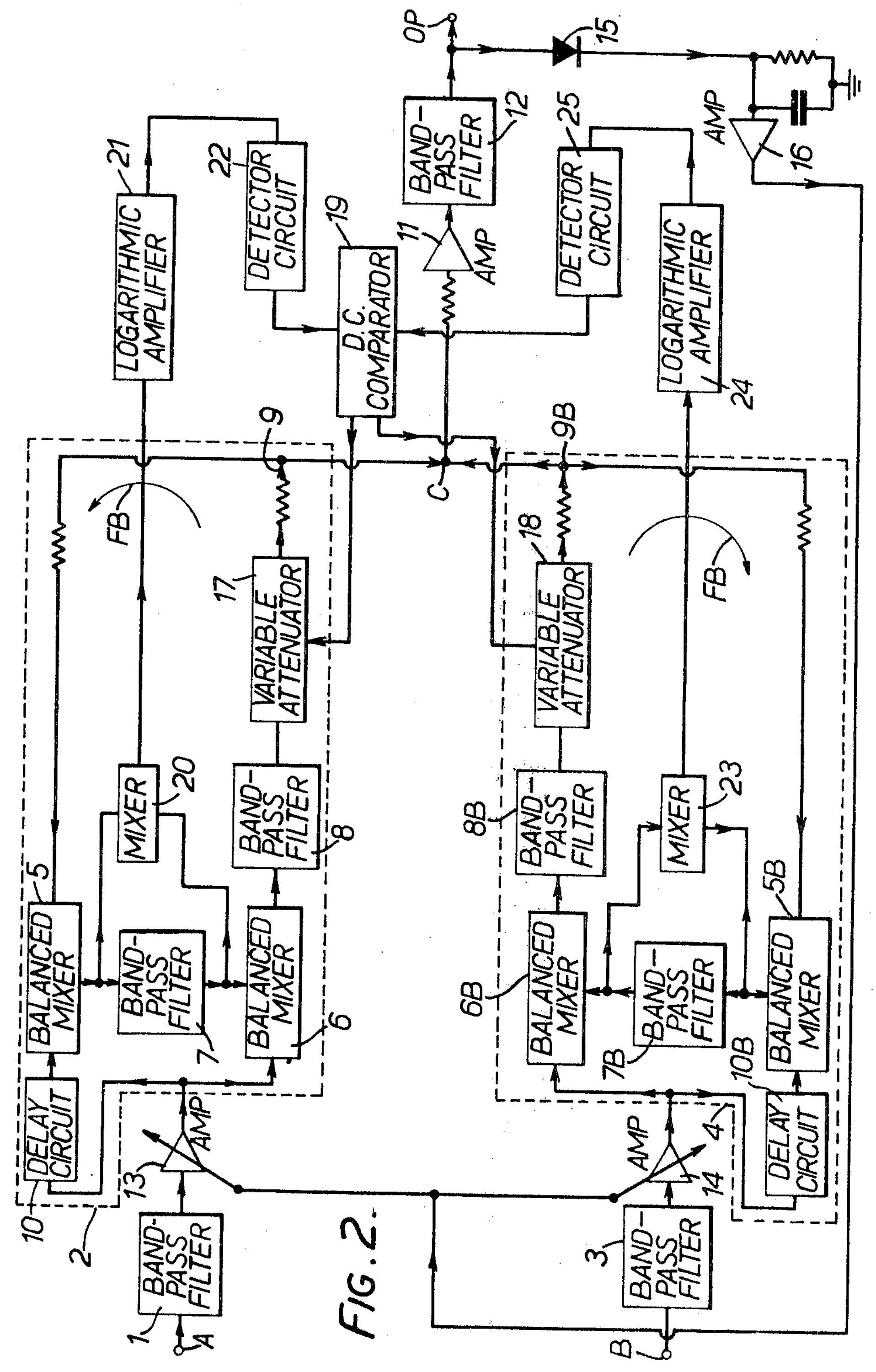
Figure 3:
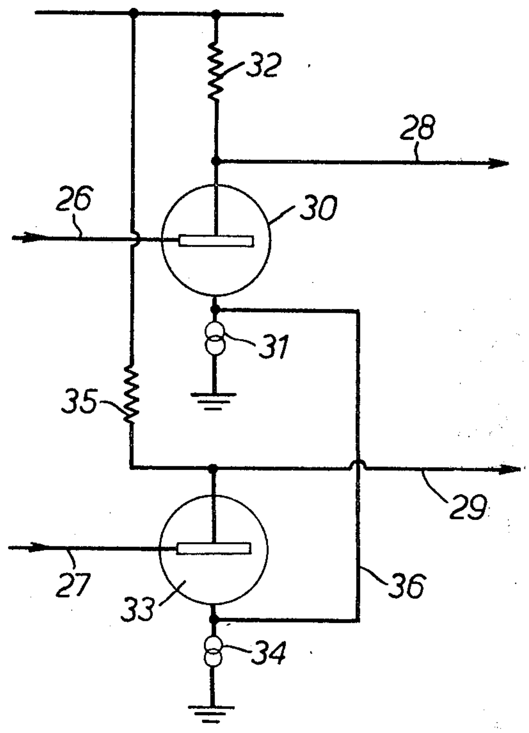

The invention is further described with reference to FIGS. 2 and 3 of the accompanying drawings of which, FIG. 2 shows one example of a diverse signal combining arrangement in accordance with the present invention in which two diverse channels are required to be combined, and FIG. 3 is a circuit diagram of a D.C. comparator which may be used in the arrangement of FIG. 2.

In the FIGS. 2 and 3, like references are used to denote like parts of FIG. 1 and it is only necessary to describe the detailed differences between the circuit of FIG. 2 and the circuit of FIG. 1.

Between band pass filter 8 and terminal 9 is connected a variable attenuator 17. Similarly between band pass filter 8B and terminal 9B is connected another variable attenuator 18. Attenuators 17 and 18 are connected to be controlled in opposite fashion by a D.C. comparator 19. D.C. comparator 19 derives one input from a mixer 20, which mixer has one input connected to the output of balanced mixer 5 and its second input connected to the output of band pass filter 7. The output of mixer 20 is connected to the first input of D.C. comparator 19 via a logarithmic amplifier 21 and a detector circuit 22.

The second input of D.C. comparator 19 is derived from a mixer 23, which mixer has one input connected to the output of balanced mixer 5B and its second input to the output of band pass filter 7B. The output of mixer 23 is connected to the second input of D.C. comparator 19 via a logarithmic amplifier 24 and a detector circuit 25.

In operation, the signal at the output of balanced mixer 5 will contain no modulation, but will exhibit any intermodulation products present in the channel connected to A, since these will be present only in the input path of balanced mixer 5 which contains delay circuit 10. These intermodulation products will not be present at the output of band pass filter 7. Thus the output of mixer 20 will comprise only the intermodulation products.

Similarly the output of mixer 23 will contain only the intermodulation products in the channel applied to terminal B.

The intermodulation products after amplification in logarithmic amplifiers 21 and 24 respectively and detection in detector circuits 22 and 25 respectively provide D.C. inputs to D.C. comparator 19. D.C. comparator 19 then controls the degree of attenuation provided by variable attenuator 17 and 18 in opposite fashion, so that the greater the D.C. signal from detector circuit 22 compared with that from detector circuit 25, the greater will be the relative attenuation provided by variable attenuator 17 compared with that provided by variable attenuator 18, and vice versa.

At common terminal C, therefore, the contribution to the common output signal provided by each channel depends upon the degree of freedom of the signal in that channel from intermodulation products.

As with the arrangement of FIG. 1 the signals in the two channels may be diverse in space, time or phase, and frequency, at least if the filters 7 and 7B are tracking filter arrangements in accordance with the invention in our co-pending application No. 16738/72.

Referring to FIG. 3, the D.C. comparator 19 in FIG. 2 may take the form illustrated here. Output from detector circuit 22 of FIG. 2 is connected to lead 26, whilst output from detector circuit 25 of FIG. 2 is connected to lead 27. Lead 28 is connected to control variable attenuator 17 of FIG. 2, whilst lead 29 is connected to control variable attenuator 18 of FIG. 2.

Lead 26 is connected to the base electrode (i.e. the gate) of an F.E.T. transistor 30. The emitter (i.e. drain) electrode of transistor 30 is connected to a constant current sink 31, whilst a load resistor 32 is connected in the collector (i.e. sink) path of transistor 30. Similarly lead 27 is connected to the base electrode of a further F.E.T. transistor 33, the emitter of which is connected to a constant current sink 34 and the collector circuit of which includes a load resistor 35. The emitter electrodes of transistor 30 and 33 are connected together by a reference link arm 36.

In operation, if the D.C. signals derived by leads 26 and 27 from detector circuits 22 and 25 respectively are equal, indicating equal degrees of intermodulation interference in each channel, each of the transistors 30 and 33 in FIG. 3 will pass equal currents.

If on the other hand a D.C. signal is derived by lead 26 from detector circuit 22, which is greater than that derived by lead 27 from detector circuit 25, indicating that the channel connected to terminal A of FIG. 2 exhibits a greater degree of intermodulation interference than the channel connected to terminal B, F.E.T. transistor 30 will draw relatively more current and F.E.T. transistor 33 relatively less current. The voltage appearing across resistor 32 will thereupon increase and that appearing across resistor 35 decrease to provide the control signals on leads 28 and 29 required for adjustment of variable attenuators 17 and 18.

In practice three, four or more diverse signal channels may be required to be combined in which case the D.C. comparator may be provided as one which compares each of the D.C. input signals representing intermodulation products in the different channels with the others and applies attenuating control signals to the variable attenuator provided in respect of any channel which exhibits intermodulation interference of greater than the average level.

I claim:

1. A diversity combining arrangement comprising a plurality of signal handling arrangements, one for each diverse channel to be combined, each having means for connecting an individual diverse signal channel thereto and each comprising two balanced mixers, means for applying input signals in parallel to both mixers, which input signals contain intermodulation product signals, means for deriving a second input for one of said mixers from the output of the other via band pass filter means adapted to pass signals in one of the side bands of the output from said other mixer, further band pass filter means connected to apply output from said one mixer as second input for said other mixer, output means for taking output signals from the output of said first mentioned band pass filter means, means being provided for combining the output signals appearing at the output means of each signal handling circuit under the control of comparator means connected to derive inputs from intermodulation product signal detecting means provided one for each signal handling arrangement and each comprising a third mixer connected to derive one input from the output of the said one mixer and a second input from the output of said further band pass filter means in the respective signal handling circuit, whereby the contribution from each channel to the combined output signal is related to the degree of intermodulation present in that channel.

2. An arrangement as claimed in claim 1 and wherein in each case, the output of said third mixer is connected to the input of a logarithmic amplifier, the output of which is connected via a detector circuit to said comparator means which is a D.C. signal comparator.

3. An arrangement for combining a plurality of diverse signals comprising in combination input channel means, one for each diverse signal;

a plurality of signal handling circuits, each connected to one of said input channel means and each including a first balanced mixer and a second balanced mixer, each connected to said input channel means for receiving a diverse signal which contains intermodulation signal components, first bank pass filter means connected between said first and second balanced mixers and having a sufficiently narrow pass band as to pass to the second mixer the lower side band of the output of said first mixer with the intermodulation signal components removed, and second band pass filter means connected between said first and second balanced mixers and having a sufficiently wide pass band as to pass to the first balanced mixer a lower side band of the output of said second mixer with the expected excursions of the diverse signal;

third mixer means, one for each signal handling circuit, connected to the outputs of said first mixer and of said first band pass filter means so as to produce as its output intermodulation components only;

comparator means connected to derive its input from each of the third mixer means to produce therefrom attenuation control signals, one for each signal handling circuit, which are intermodulation-dependent;

attenuator means connected between each second band pass filter means and its associated first mixer and controlled by its respective attenuation control signal so as to attenuate the output signal of its associated signal handling circuit; and output means connected to the outputs of said attenuator means to combine the attenuated signals.

4. An arrangement as recited in claim 3 including a logarithmic amplifier connected to the output of said third mixer means and a detector circuit connected between the output of said logarithmic amplifier and said comparator means.

* * * * *